(12) United States Patent
Zeng et al.

(10) Patent No.: US 12,422,537 B2
(45) Date of Patent: Sep. 23, 2025

(54) METHOD AND APPARATUS FOR DETECTING SIGNAL PROPAGATION TYPE

(71) Applicant: Robert Bosch GmbH, Stuttgart (DE)

(72) Inventors: Zhuoqi Zeng, Shanghai (CN); Huajun Yu, Shanghai (CN); William Wang, Shanghai (CN)

(73) Assignee: Robert Bosch GmbH, Stuttgart (DE)

( * ) Notice: Subject to any disclaimer, the term of this patent is extended or adjusted under 35 U.S.C. 154(b) by 1242 days.

(21) Appl. No.: 17/272,407

(22) PCT Filed: Aug. 31, 2018

(86) PCT No.: PCT/CN2018/103492
§ 371 (c)(1),
(2) Date: Mar. 1, 2021

(87) PCT Pub. No.: WO2020/042143
PCT Pub. Date: Mar. 5, 2020

(65) Prior Publication Data
US 2021/0318422 A1 Oct. 14, 2021

(51) Int. Cl.
*G01S 13/02* (2006.01)
*G01S 7/41* (2006.01)
(Continued)

(52) U.S. Cl.
CPC ............ *G01S 13/0209* (2013.01); *G01S 7/41* (2013.01); *G01S 13/58* (2013.01); *G01S 13/89* (2013.01)

(58) Field of Classification Search
CPC ... H04B 17/373; H04B 17/318; H04W 4/029; H04W 64/00; H04W 4/02; H04W 40/244;
(Continued)

(56) References Cited

U.S. PATENT DOCUMENTS 5,365,516 A * 11/1994 Jandrell ............... G01S 5/0009
370/335
2008/0158060 A1* 7/2008 Lee ..................... G01S 5/0218
342/450
(Continued)

FOREIGN PATENT DOCUMENTS

CN 102932739 A 2/2013
CN 103399297 A 11/2013
(Continued)

OTHER PUBLICATIONS

Translation of International Search Report for Application No. PCT/CN2018/103492 dated May 20, 2019 (3 pages).
(Continued)

*Primary Examiner* — Olumide Ajibade Akonai
(74) *Attorney, Agent, or Firm* — Michael Best & Friedrich LLP

(57) ABSTRACT

The present invention relates to a method and apparatus for detecting the type of signal propagation, the method comprising: calculating a plurality of similarity values when a location base station in an ultra-wideband location system currently receives a pulse response from a location tag, wherein each of the similarity values represents the degree of similarity between the currently received pulse response and one of a plurality of reference pulse responses, and the plurality of reference pulse responses are pulse responses from at least one location tag that were previously received by the location base station where the type of signal propagation between the location base station and the at least one location tag is a specific type of signal propagation; and determining, based on the plurality of similarity values, a current type of signal propagation between the location base station and the location tag. The method and apparatus can be used to detect the type of signal propagation between the location base station and the location tag in the UWB location system.

10 Claims, 2 Drawing Sheets

(51) Int. Cl.
*G01S 13/58* (2006.01)
*G01S 13/89* (2006.01)

(58) Field of Classification Search
CPC ... H04W 64/003; H04W 88/02; H04W 84/18;
H04W 88/08; H04W 52/242; G01S
5/0218; G01S 5/0273; G01S 5/0036
See application file for complete search history.

(56) References Cited

U.S. PATENT DOCUMENTS

| | | |
|---|---|---|
| 2011/0177786 A1 | 7/2011 | Marano et al. |
| 2014/0062793 A1 | 3/2014 | AlSindi et al. |
| 2014/0329520 A1* | 11/2014 | Militano ............... G01S 5/0258 455/422.1 |

FOREIGN PATENT DOCUMENTS

| | | |
|---|---|---|
| CN | 107037402 A | 8/2017 |
| CN | 107817469 A | 3/2018 |

OTHER PUBLICATIONS

Tian et al., "Mine Ultra-wideband Positioning Method Based on Non Line-of-sight Identification Weighted Fitting", Journal of China Coal Society, vol. 38, No. 3, Mar. 2013, pp. 512-516.
Xiao et al., "NLOS Identification Based on Statistic Analysis of UWB Localization Error," Journal of Jilin University (Engineering and Technology Edition), 2010, vol. 40, No. 5, pp. 1381-1385.

* cited by examiner

METHOD AND APPARATUS FOR DETECTING SIGNAL PROPAGATION TYPE

BACKGROUND OF THE INVENTION

The present invention relates to the field of ultra-wideband (UWB) location, and in particular to a method and apparatus for detecting the type of signal propagation, and a computing device and a machine-readable storage medium.

UWB location is a technology that uses very narrow pulse responses and a bandwidth above 1 GHz to locate objects indoors. A UWB location system comprises a plurality of location base stations and a location tag attached to an object to be located. The location tag sends a pulse signal, and the pulse signal is channel modulated and then becomes a pulse response when reaching the location base stations. The UWB location system determines the location of the object by using the pulse response from the location tag that is received by the location base stations.

When signal propagation between the location base stations and the location tag is line-of-sight propagation without an obstacle, the UWB location system may obtain an accurate location of the object. However, if the signal propagation between the location base stations and the location tag is non-line-of-sight propagation with an obstacle, the location obtained by the UWB location system is usually inaccurate.

Therefore, during the UWB location, it is very important to identify the type of signal propagation between a location base station and a location tag.

SUMMARY OF THE INVENTION

Embodiments of the present invention provide a method and apparatus for detecting the type of signal propagation, and a computing device and a machine-readable storage medium, which can be used to detect the type of signal propagation between a location base station and a location tag in a UWB location system.

A method for detecting the type of signal propagation according to an embodiment of the present invention comprises: calculating a plurality of similarity values when a location base station in an ultra-wideband location system currently receives a pulse response from a location tag, wherein each of the similarity values represents the degree of similarity between the currently received pulse response and one of a plurality of reference pulse responses, and the plurality of reference pulse responses are pulse responses from at least one location tag that were previously received by the location base station where the type of signal propagation between the location base station and the at least one location tag is a specific type of signal propagation; and determining, based on the plurality of similarity values, a current type of signal propagation between the location base station and the location tag.

An apparatus for detecting the type of signal propagation according to an embodiment of the present invention comprises: a calculation module configured to calculate a plurality of similarity values when a location base station in an ultra-wideband location system currently receives a pulse response from a location tag, wherein each of the similarity values represents the degree of similarity between the currently received pulse response and one of a plurality of reference pulse responses, and the plurality of reference pulse responses are pulse responses from at least one location tag that were previously received by the location base station where the type of signal propagation between the location base station and the at least one location tag is a specific type of signal propagation; and a determination module configured to determine, based on the plurality of similarity values, a current type of signal propagation between the location base station and the location tag.

A computing device according to an embodiment of the present invention comprises: a processor; and a memory storing executable instructions that, when executed, cause the processor to perform the operations comprised in the method described above.

A machine-readable storage medium according to an embodiment of the present invention has executable instructions thereon that, when executed, cause a machine to perform the operations comprised in the method described above.

In the solutions of the embodiments of the present invention, a pulse response from a location tag that is currently received by a location base station in a UWB location system and a plurality of reference pulse responses from at least one location tag that were previously received by the location base station in a certain type of signal propagation are used to determine a current type of signal propagation between the location base station and the location tag, so that the type of signal propagation between the location base station and the location tag in the UWB location system can be detected according to the solutions of the embodiments of the present invention.

DESCRIPTION OF THE DRAWINGS

Other features, characteristics, benefits and advantages of the present invention will become more apparent from the following detailed description in conjunction with the accompanying drawings. In the figures.

DETAILED DESCRIPTION

Various embodiments of the present invention are described below in detail with reference to the accompanying drawings.

Figure 1:
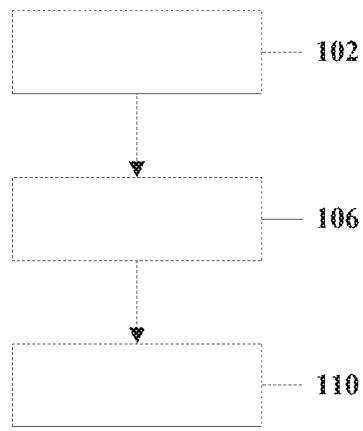
FIG. 1 shows an overall flowchart of a method for detecting the type of signal propagation according to one embodiment of the present invention.

FIG. 1 shows an overall flowchart of a method for detecting the type of signal propagation according to one embodiment of the present invention. The method 100 shown in FIG. 1 may be carried out by any computing device having a computing capability. The computing device can be, but is not limited to, a desktop computer, a notebook computer, a tablet computer, a server, or the like.

As shown in FIG. 1, in block 102, a location base station Bi in a UWB location system currently receives a pulse response IN from a location tag Ti.

In block 106, a plurality of similarity values is calculated according to the currently received pulse response IN and a plurality of reference pulse responses MR for the location base station Bi, wherein each of the similarity values indicates the degree of similarity between the pulse response IN and one of the plurality of reference pulse responses MR.

The plurality of reference pulse responses MR for the location base station Bi are pulse responses from at least one location tag that were previously received by the location base station Pi where the type of signal propagation between the location base station and the at least one location tag is a specific type of signal propagation S. The specific type of signal propagation S may be line-of-sight propagation or non-line-of-sight propagation.

In one aspect, the plurality of similarity values is calculated where both the pulse response IN and the plurality of reference pulse responses MR for the location base station Bi are regarded as probability density functions. In this case, for example but without limitation, a Kolmogorov-Smirnov (KS) test, a chi-squared test, a G-test, a Fisher's exact test, a binomial test, or an exact (significance) test and other algorithms may be used to calculate the degree of similarity between the pulse response IN and each of the plurality of reference pulse responses MR for the location base station Bi, so as to calculate the plurality of similarity values. Alternatively, a maximum distance of a cumulative distribution function between the pulse response IN and any one of the plurality of reference pulse responses MR for the location base station Bi may be calculated as the degree of similarity between the pulse response IN and the reference pulse response, so as to calculate the plurality of similarity values.

In another aspect, the plurality of similarity values is calculated where both the pulse response IN and the plurality of reference pulse responses MR for the location base station Bi are regarded as trajectories. In this case, the Euclidean distance, dynamic time warping, longest common sub-sequence, edit distance, Chebyshev distance, Manhattan distance, Hausdorff distance, Frechet distance, one-way distance, cosine similarity, locality in-between polylines, polylines or clue-aware trajectory similarity, or a related coefficient value (for example, a mean square root or a variance, etc.) between the pulse response IN and any one of the plurality of reference pulse responses MR for the location base station Bi may be calculated as the degree of similarity between the pulse response IN and the reference pulse response, so as to calculate the plurality of similarity values.

In block 110, the plurality of calculated similarity values is used to determine a current type of signal propagation between the location base station Bi and the location tag Ti. For example but without limitation, if at least half of the plurality of similarity values are greater than a first threshold, it is determined that the current type of signal propagation between the location base station Bi and the location tag Ti is the specific type of signal propagation S, otherwise, it is determined that the current type of signal propagation between the location base station Bi and the location tag Ti is the other one of the line-of-sight propagation and the non-line-of-sight propagation that is different from the specific type of signal propagation S. For another example but without limitation, the average value of the plurality of similarity values is calculated, and if the average value is greater than a second threshold, it is determined that the current type of signal propagation between the location base station Bi and the location tag Ti is the specific type of signal propagation S, otherwise, it is determined that the current type of signal propagation between the location base station Bi and the location tag Ti is the other one of the line-of-sight propagation and the non-line-of-sight propagation that is different from the specific type of signal propagation S.

In the solution of this embodiment, a pulse response from a location tag that is currently received by a location base station in a UWB location system and a plurality of reference pulse responses from at least one location tag that were previously received by the location base station in a certain type of signal propagation are used to determine a current type of signal propagation between the location base station and the location tag, so that the type of signal propagation between the location base station and the location tag in the UWB location system can be detected according to the solution of this embodiment.

Other Variations

Those skilled in the art will understand that although in the above embodiment, the similarity values are calculated where both the pulse response IN and the plurality of reference pulse responses MR for the location base station Bi are regarded as probability density functions or trajectories, the present invention is not limited thereto. In some other embodiments of the present invention, the similarity values may be calculated with the pulse response IN and the plurality of reference pulse responses MR for the location base station Bi by using any other methods.

Figure 2:
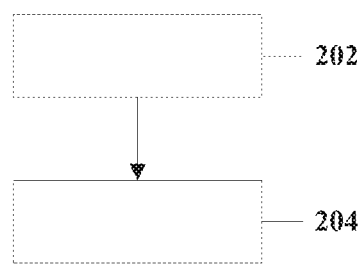
FIG. 2 shows a flowchart of a method for detecting the type of signal propagation according to one embodiment of the present invention.

FIG. 2 shows a flowchart of a method for detecting the type of signal propagation according to one embodiment of the present invention. The method 200 shown in FIG. 2 may be carried out by any computing device having a computing capability. The computing device can be, but is not limited to, a desktop computer, a notebook computer, a tablet computer, a server, or the like.

As shown in FIG. 2, the method 200 may comprise block 202 of calculating a plurality of similarity values when a location base station in an ultra-wideband location system currently receives a pulse response from a location tag, wherein each of the similarity values represents the degree of similarity between the currently received pulse response and one of a plurality of reference pulse responses, and the plurality of reference pulse responses are pulse responses from at least one location tag that were previously received by the location base station where the type of signal propagation between the location base station and the at least one location tag is a specific type of signal propagation.

The method 200 may further comprise block 204 of determining, based on the plurality of similarity values, a current type of signal propagation between the location base station and the location tag.

In one aspect, the plurality of similarity values is calculated where both the currently received pulse response and the plurality of reference pulse responses are regarded as probability density functions.

In another aspect, the plurality of similarity values is calculated where both the currently received pulse response and the plurality of reference pulse responses are regarded as trajectories.

In still another aspect, the specific type of signal propagation is one of line-of-sight propagation and non-line-of-sight propagation, and block 204 comprises: determining, if at least half of the plurality of similarity values are greater than a first threshold, that the current type of signal propagation between the location base station and the location tag is the specific type of signal propagation, otherwise, determining that the current type of signal propagation between the location base station and the location tag is the other one of the line-of-sight propagation and the non-line-of-sight propagation that is different from the specific type of signal propagation; or determining, if the average value of the plurality of similarity values is greater than a second threshold, that the current type of signal propagation between the location base station and the location tag is the specific type of signal propagation, otherwise, determining that the current type of signal propagation between the location base station and the location tag is the other one of the line-of-sight propagation and the non-line-of-sight propagation that is different from the specific type of signal propagation.

Figure 3:
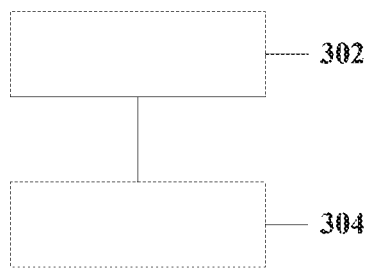
FIG. 3 shows a schematic diagram of an apparatus for detecting the type of signal propagation according to one embodiment of the present invention.

FIG. 3 shows a schematic diagram of an apparatus for detecting the type of signal propagation according to one embodiment of the present invention. The apparatus 300 shown in FIG. 3 may be implemented by software, hardware, or a combination of software and hardware. The apparatus 300 shown in FIG. 3 may be, for example, installed on any suitable computing device having a computing capability.

As shown in FIG. 3, the apparatus 300 may comprise a calculation module 302 and a determination module 304. The calculation module 302 is configured to calculate a plurality of similarity values when a location base station in an ultra-wideband location system currently receives a pulse response from a location tag, wherein each of the similarity values represents the degree of similarity between the currently received pulse response and one of a plurality of reference pulse responses, and the plurality of reference pulse responses are pulse responses from at least one location tag that were previously received by the location base station where the type of signal propagation between the location base station and the at least one location tag is a specific type of signal propagation. The determination module 304 is configured to determine, based on the plurality of similarity values, a current type of signal propagation between the location base station and the location tag.

In one aspect, the plurality of similarity values is calculated where both the currently received pulse response and the plurality of reference pulse responses are regarded as probability density functions.

In another aspect, the plurality of similarity values is calculated where both the currently received pulse response and the plurality of reference pulse responses are regarded as trajectories.

In still another aspect, the specific type of signal propagation is one of line-of-sight propagation and non-line-of-sight propagation, and the determination module 304 comprises: a module for determining, if at least half of the plurality of similarity values are greater than a first threshold, that the current type of signal propagation between the location base station and the location tag is the specific type of signal propagation, otherwise, determining that the current type of signal propagation between the location base station and the location tag is the other one of the line-of-sight propagation and the non-line-of-sight propagation that is different from the specific type of signal propagation; or a module for determining, if the average value of the plurality of similarity values is greater than a second threshold, that the current type of signal propagation between the location base station and the location tag is the specific type of signal propagation, otherwise, determining that the current type of signal propagation between the location base station and the location tag is the other one of the line-of-sight propagation and the non-line-of-sight propagation that is different from the specific type of signal propagation.

Figure 4:
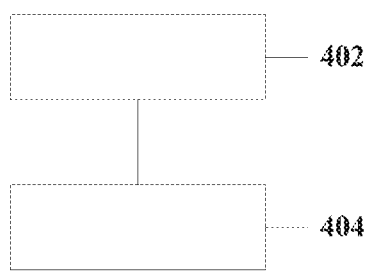
FIG. 4 shows a schematic diagram of a computing device according to one embodiment of the present invention.

FIG. 4 shows a schematic diagram of a computing device according to one embodiment of the present invention. As shown in FIG. 4, the computing device 400 may comprise a processor 402 and a memory 404 coupled to the processor 402. The memory 404 stores executable instructions that, when executed, cause the processor 402 to perform the method 100 or 200.

An embodiment of the present invention further provides a machine-readable storage medium having executable instructions thereon that, when executed, cause a machine to perform the method 100 or 200.

Those skilled in the art should understand that various variations, modifications, and changes may be made to the various embodiments disclosed above without departing from the essence of the invention, and these variations, modifications, and changes shall all fall within the protection scope of the present invention. Therefore, the protection scope of the present invention is defined by the appended claims.

The invention claimed is:

1. A method for detecting a type of signal propagation, the method comprising:
calculating a plurality of similarity values when a location base station in an ultra-wideband location system currently receives a pulse response from a location tag, wherein each of the similarity values represents the degree of similarity between the currently received pulse response and one of a plurality of reference pulse responses, and the plurality of reference pulse responses are pulse responses from at least one location tag that were previously received by the location base station where the type of signal propagation between the location base station and the at least one location tag is a specific type of signal propagation; and
determining, based on the plurality of similarity values, a current type of signal propagation between the location base station and the location tag.

2. The method of claim 1, wherein the plurality of similarity values is calculated where both the currently received pulse response and the plurality of reference pulse responses are regarded as probability density functions.

3. The method of claim 1, wherein the plurality of similarity values is calculated where both the currently received pulse response and the plurality of reference pulse responses are regarded as trajectories.

4. The method of claim 1, wherein
the specific type of signal propagation is one of line-of-sight propagation and non-line-of-sight propagation, and
the determining a current type of signal propagation between the location base station and the location tag comprises:
determining, if at least half of the plurality of similarity values are greater than a first threshold, that the current type of signal propagation between the location base station and the location tag is the specific type of signal propagation, otherwise, determining that the current type of signal propagation between the location base station and the location tag is the other one of the line-of-sight propagation and the non-line-of-sight propagation that is different from the specific type of signal propagation; or
determining, if the average value of the plurality of similarity values is greater than a second threshold, that the current type of signal propagation between the location base station and the location tag is the specific type of signal propagation, otherwise, determining that the current type of signal propagation between the location base station and the location tag is the other one of the line-of-sight propagation and the non-line-of-sight propagation that is different from the specific type of signal propagation.

5. An apparatus for detecting a type of signal propagation, the apparatus comprising:
processor configured to calculate a plurality of similarity values when a location base station in an ultra-wideband location system currently receives a pulse response from a location tag, wherein each of the similarity values represents the degree of similarity between the currently received pulse response and one of a plurality of reference pulse responses, and the plurality of reference pulse responses are pulse responses from at least one location tag that were previously received by the location base station where the type of signal propagation between the location base station and the at least one location tag is a specific type of signal propagation; and the processor configured to determine, based on the plurality of similarity values, a current type of signal propagation between the location base station and the location tag.

6. The apparatus of claim 5, wherein the plurality of similarity values is calculated where both the currently received pulse response and the plurality of reference pulse responses are regarded as probability density functions.

7. The apparatus of claim 5, wherein the plurality of similarity values is calculated where both the currently received pulse response and the plurality of reference pulse responses are regarded as trajectories.

8. The apparatus of claim 5, wherein the specific type of signal propagation is one of line-of-sight propagation and non-line-of-sight propagation, and the processor is configured to:

determine, if at least half of the plurality of similarity values are greater than a first threshold, that the current type of signal propagation between the location base station and the location tag is the specific type of signal propagation, otherwise, determine that the current type of signal propagation between the location base station and the location tag is the other one of the line-of-sight propagation and the non-line-of-sight propagation that is different from the specific type of signal propagation; or determine, if the average value of the plurality of similarity values is greater than a second threshold, that the current type of signal propagation between the location base station and the location tag is the specific type of signal propagation, otherwise, determine that the current type of signal propagation between the location base station and the location tag is the other one of the line-of-sight propagation and the non-line-of-sight propagation that is different from the specific type of signal propagation.

9. A computing device, comprising:

a processor; and a memory storing executable instructions that, when executed, cause the processor to calculate a plurality of similarity values when a location base station in an ultra-wideband location system currently receives a pulse response from a location tag, wherein each of the similarity values represents the degree of similarity between the currently received pulse response and one of a plurality of reference pulse responses, and the plurality of reference pulse responses are pulse responses from at least one location tag that were previously received by the location base station where the type of signal propagation between the location base station and the at least one location tag is a specific type of signal propagation; and determine, based on the plurality of similarity values, a current type of signal propagation between the location base station and the location tag.

10. A non-transitory, computer-readable storage medium having executable instructions thereon that, when executed by a computer, cause the computer to calculate a plurality of similarity values when a location base station in an ultra-wideband location system currently receives a pulse response from a location tag, wherein each of the similarity values represents the degree of similarity between the currently received pulse response and one of a plurality of reference pulse responses, and the plurality of reference pulse responses are pulse responses from at least one location tag that were previously received by the location base station where the type of signal propagation between the location base station and the at least one location tag is a specific type of signal propagation; and determine, based on the plurality of similarity values, a current type of signal propagation between the location base station and the location tag.

* * * * *